(12) United States Patent
Jeon

(10) Patent No.: US 7,964,151 B2
(45) Date of Patent: Jun. 21, 2011

(54) APPARATUS AND METHOD FOR PRODUCING CARBON NANOTUBES

(75) Inventor: Jong-Kwan Jeon, Gyeonggi-do (KR)

(73) Assignee: Semes Co., Ltd., Chungcheongnam-do (KR)

( * ) Notice: Subject to any disclaimer, the term of this patent is extended or adjusted under 35 U.S.C. 154(b) by 298 days.

(21) Appl. No.: 12/231,637

(22) Filed: Sep. 4, 2008

(65) Prior Publication Data

US 2009/0068084 A1 Mar. 12, 2009

(30) Foreign Application Priority Data

Sep. 6, 2007 (KR) .................. 10-2007-0090527

(51) Int. Cl.
*B01J 10/00* (2006.01)
*C09C 1/00* (2006.01)
(52) U.S. Cl. ........ 422/129; 422/150; 422/151; 422/152; 422/198; 422/199; 422/232; 977/842; 977/843; 977/844; 977/890; 977/891; 423/445 R; 423/447.2; 423/447.3
(58) Field of Classification Search .................. 422/129, 422/150, 151, 152, 198, 199, 232; 423/447.2, 423/447.3, 445 R; 55/338; 977/891, 846, 977/844, 842, 843, 890; 118/715, 720, 721
See application file for complete search history.

(56) References Cited

U.S. PATENT DOCUMENTS

| | | | |
|---|---|---|---|
| 6,080,446 A * | 6/2000 | Tobe et al. | 427/255.394 |
| 6,302,965 B1 * | 10/2001 | Umotoy et al. | 118/715 |
| 6,800,369 B2 * | 10/2004 | Gimzewski et al. | 428/408 |
| 6,883,733 B1 * | 4/2005 | Lind | 239/424 |
| 7,157,066 B2 * | 1/2007 | Diener et al. | 423/445 B |
| 2002/0102353 A1 * | 8/2002 | Mauthner et al. | 427/255.28 |
| 2003/0019428 A1 * | 1/2003 | Ku et al. | 118/715 |
| 2003/0021595 A1 * | 1/2003 | Xu et al. | 392/400 |
| 2003/0205202 A1 * | 11/2003 | Funaki et al. | 118/723 E |

FOREIGN PATENT DOCUMENTS

| | | |
|---|---|---|
| KR | 10-0281347 | 11/2000 |
| KR | 2006-91993 | 2/2005 |

* cited by examiner

*Primary Examiner* — Walter D Griffin
*Assistant Examiner* — Huy-Tram Nguyen
(74) *Attorney, Agent, or Firm* — Jenkins, Wilson, Taylor & Hunt P.A.

(57) ABSTRACT

Provided is an apparatus for producing carbon nanotubes, that is provided with a reaction chamber and a dispersion plate. The dispersion plate is provided with a plate and a gas guiding portion provided on an edge of the plate, and a catalyst supply hole is defined in the central portion of the plate, through which metal catalysts are supplied. The gas guiding portion guides source gas to the central portion of the plate and suspends the metal catalysts discharged from the catalyst supply hole in a specific direction. Thus, the apparatus for producing carbon nanotubes can prevent loss of metal catalysts and improve space utilization.

17 Claims, 5 Drawing Sheets

APPARATUS AND METHOD FOR PRODUCING CARBON NANOTUBES

CROSS-REFERENCE TO RELATED APPLICATIONS

This U.S. non-provisional patent application claims priority under 35 U.S.C. §119 of Korean Patent Application No. 10-2007-0090527, filed on Sep. 6, 2007, the entire contents of which are hereby incorporated by reference.

BACKGROUND OF THE INVENTION

The present invention disclosed herein relates to an apparatus and method for producing carbon nanotubes, and more particularly, to an apparatus and method for producing carbon nanotubes through circulating metal catalyst particles.

Carbon nanotubes are produced by bonding three adjacent carbon atoms to form a flat carbon surface latticed in a hexagonal, beehive shape, and then rolling the flat carbon surface into a cylindrical tube.

Depending on its method of projection, a carbon nanotube exhibits conductivity of metal or conductivity of semiconductors, is widely applicable in many technical fields, and is being heralded as the new material of the future. For example, carbon nanotubes can be applied to terminals of electrochemical storage devices such as secondary cells, fuel cells, and super capacitors, to electromagnetic radiation blocking devices, field emission displays, and gas sensors.

Carbon nanotubes are produced by dispersing metal catalyst particles and a hydrocarbon-based gas into a high-temperature reactor to generate a reaction. Specifically, an apparatus for producing carbon nanotubes includes a reactor, a nozzle provided inside the reactor to provide metal catalysts, and a dispersion plate provided inside the reactor to disperse carbonic gas.

The dispersion plate is provided below the nozzle, and has a plurality of holes through which gas is suctioned or discharged. Metal catalysts supplied from the nozzle are suspended in the reactor by gas supplied through the dispersion plate, and react with carbon in the gas to grow nanotubes.

As such, because the nozzle is provided inside the reactor of an apparatus for producing carbon nanotubes, the nozzle can hinder circulation of metal catalysts, and metal catalysts can amass on the nozzle, so that metal catalysts are lost. Also, because the dispersion plate is provided below the nozzle, and gas is discharged onto from the dispersion plate without a specific direction, metal deposits can be stacked on the top surface of the dispersion plate to induce channeling. Furthermore, a gas wind box for evenly distributing gas across the plurality of holes in the dispersion plate, and a heater for decomposition of gas must further be provided on the dispersion plate. Therefore space utilization is diminished.

SUMMARY OF THE INVENTION

The present invention provides an apparatus for producing carbon nanotubes that reduces loss of metal catalysts and improves space utilization.

The present invention also provides a method for producing carbon nanotubes using the above apparatus for producing carbon nanotubes.

Embodiments of the present invention provide apparatuses for producing carbon nanotubes, including a reaction chamber and a dispersion plate.

In some embodiments, the reaction chamber may provide a reaction space for producing carbon nanotubes. The dispersion plate may be provided on a bottom surface of the reaction chamber, and may discharge a source gas for producing carbon nanotubes into the reaction space. Specifically, the dispersion plate may include a plate and a gas guiding portion. The gas guiding portion may be provided on an end portion of an upper surface of the plate, to receive a supply of a source gas from the outside and guide the source gas to a center of the plate.

In other embodiments, the plate may define a catalyst supply hole at the central portion thereof. The metal catalysts may flow through the catalyst supply hole into the reaction space, and react with the source gas to produce carbon nanotubes.

In still other embodiments, the gas guiding portion, together with the plate, may define a gas storing space into which the source gas enters in a first stage, and may define a gas outlet that discharges the source gas that enters the gas storage space toward the central portion of the plate.

In even other embodiments, the gas guiding portion may include a first guide surface facing the plate, a second guide surface extending from the plate and connected to the first guide surface, and a third guide surface extending from the first guide surface to face the second guide surface, and defining the gas outlet.

In yet other embodiments, the third guide surface may be separated from the plate to define the gas outlet.

In further embodiments, the plate may include an upper surface that gradually protrudes from the upper surface edge of the plate where the gas guiding portion is provided toward the catalyst supply hole.

In still further embodiments, the plate may include at least one gas inlet through which the source gas flows into the gas storing space, and the apparatus may further include a gas supply line for supplying the source gas through the gas inlet to the gas guiding portion.

In even further embodiments, the gas guiding portion may have a ring-shaped from a plan view.

In other embodiments of the present invention, methods for producing carbon nanotubes include heating a reaction chamber defining a reaction space within, providing metal catalysts and a source gas to the reaction space, and producing carbon nanotubes through reacting the metal catalysts with the source gas while suspending the metal catalysts by the source gas in the reaction space.

The providing the metal catalysts and the source gas includes providing the metal catalysts to the reaction space, and simultaneously providing the source gas to the reaction space through a bottom, side surface of the reaction chamber, and guiding the source gas provided through the bottom, side surface of the reaction chamber to a bottom, central portion of the reaction chamber.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Figure 1:
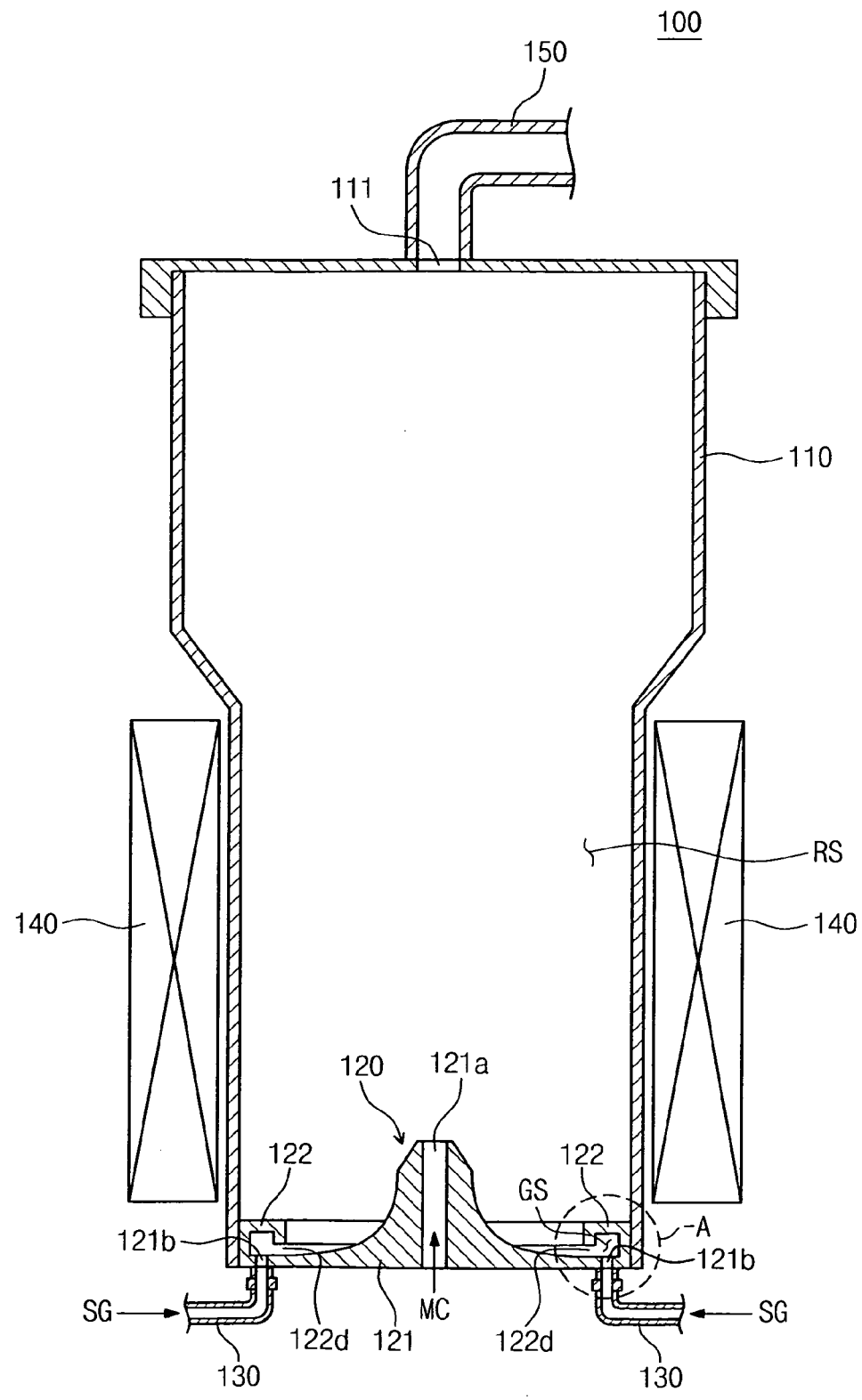
FIG. 1 is a cross sectional view of an apparatus for producing carbon nanotubes according to an embodiment of the present invention.

FIG. 1 is a cross sectional view of an apparatus for producing carbon nanotubes according to an embodiment of the present invention.

Referring to FIG. 1, an apparatus 100 for producing carbon nanotubes according to the present invention includes a reaction chamber 110, a dispersion plate 120, a plurality of gas supply lines 130, a heater unit 140, and an exhaust line 150.

The reaction chamber 110 defines a reaction space RS in which processing for producing carbon nanotubes is performed. The reaction chamber 110 has cylindrical shape, has an open bottom surface, and is formed of a material with high thermal endurance, such as stainless steel.

The dispersion plate 120 is provided on the bottom surface of the reaction chamber 110. The dispersion plate 120 flow and disperse a source gas SG and metal catalysts MC in the reaction space RS for producing carbon nanotubes.

Here, the source gas SG used may be a hydrocarbon-based gas such as acetylene, ethylene, methane, and hydrogen gas. The metal catalysts MC used may be an organic metal compound having magnetic material, such as iron (Fe), cobalt, and nickel. The source gas SG suspends the metal catalysts MC that enter the reaction space (RS) so that they do not descend onto the dispersion plate 120, and reacts with the metal catalysts MC to grow carbon nanotubes on the metal catalysts MC.

Thus, because carbon nanotubes are produced with the metal catalysts MC suspended in the reaction space RS, the more actively the metal catalysts MC are suspended, the more actively the carbon nanotubes can be grown.

Below, a detailed description of the structure of the dispersion plate 120 will be provided, with reference to the diagrams.

Figure 2:
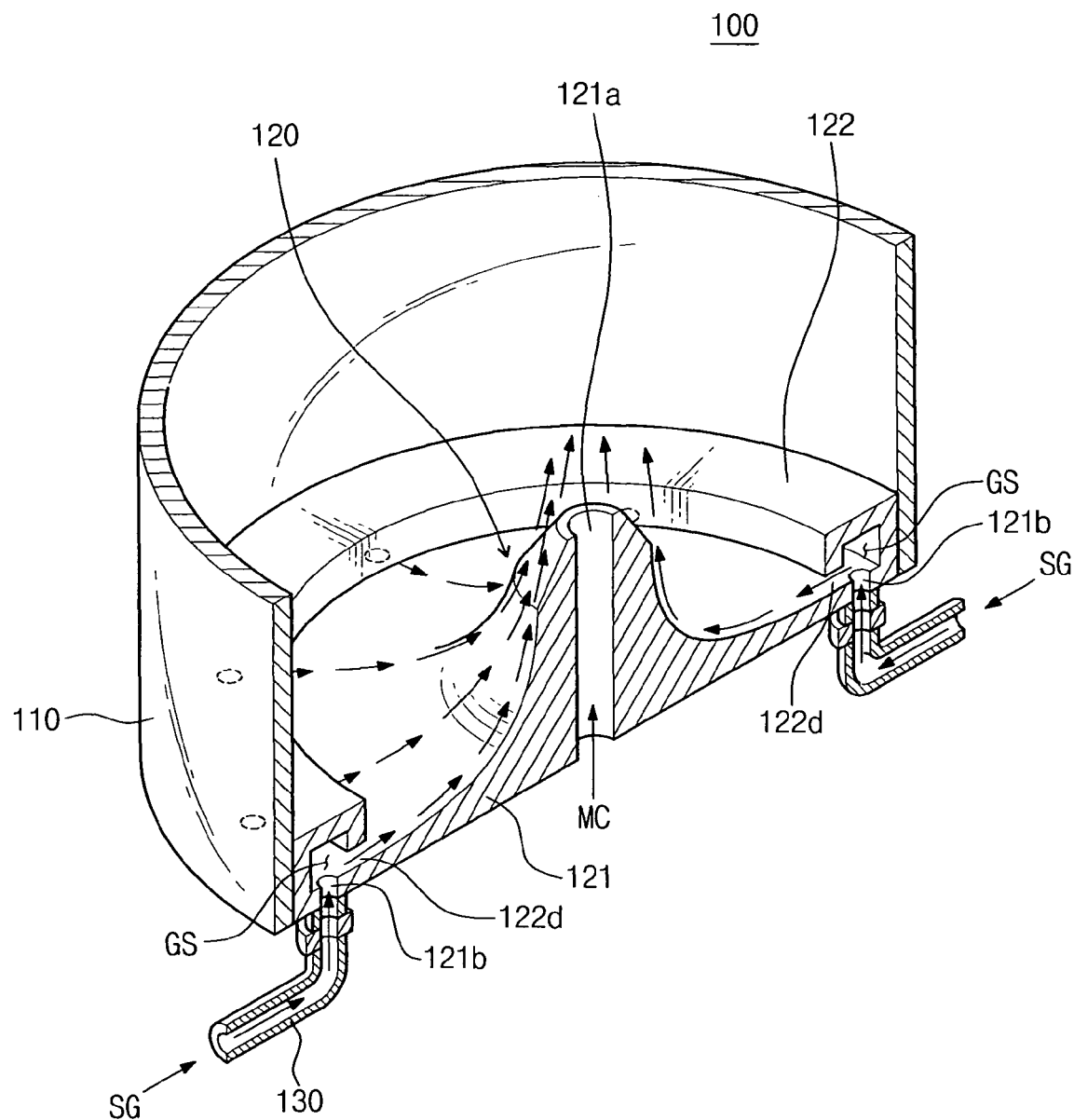
FIG. 2 is a sectional perspective view of a dispersion plate in FIG. 1.
Figure 3:
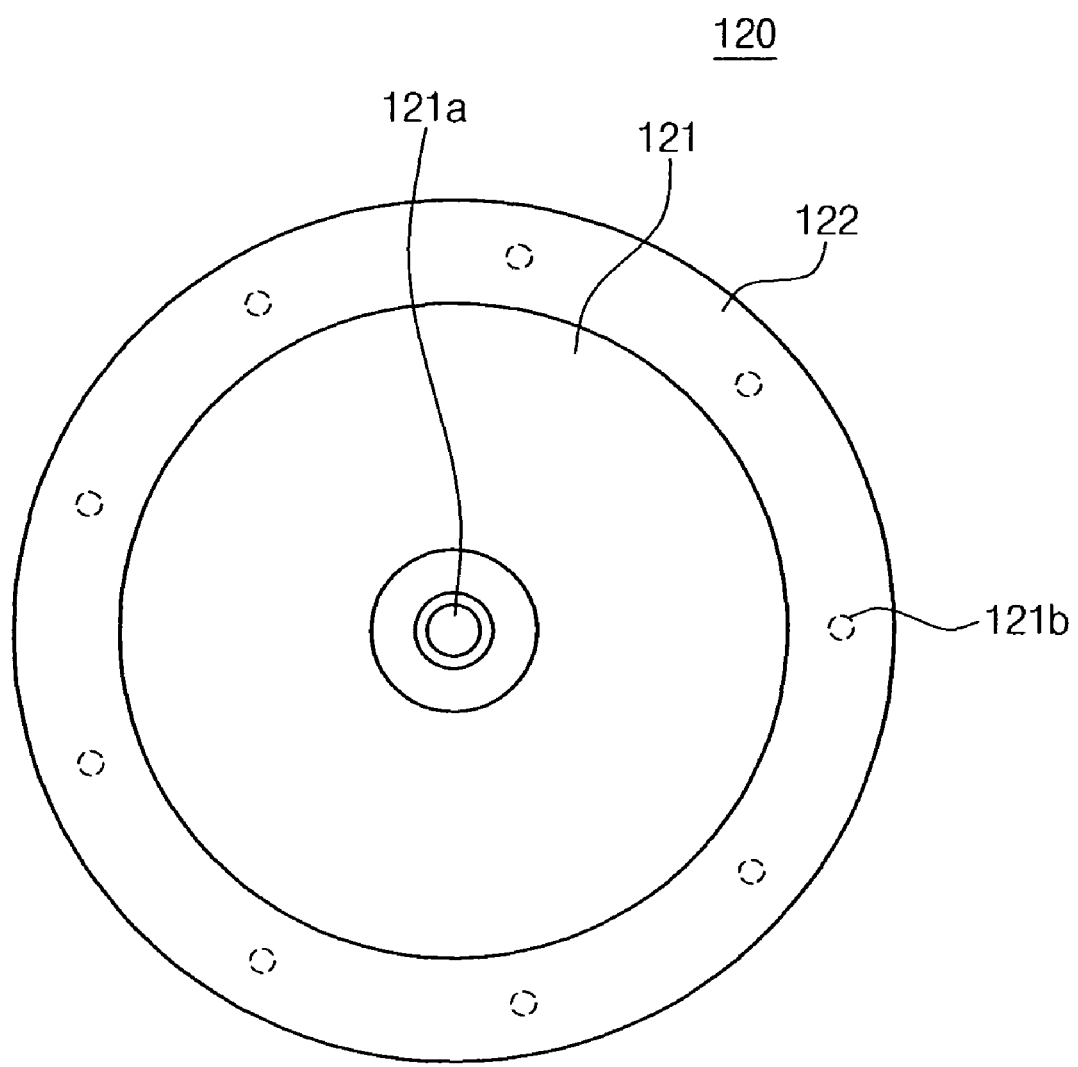
FIG. 3 is a plan view of the dispersion plate in FIG. 2.
Figure 4:
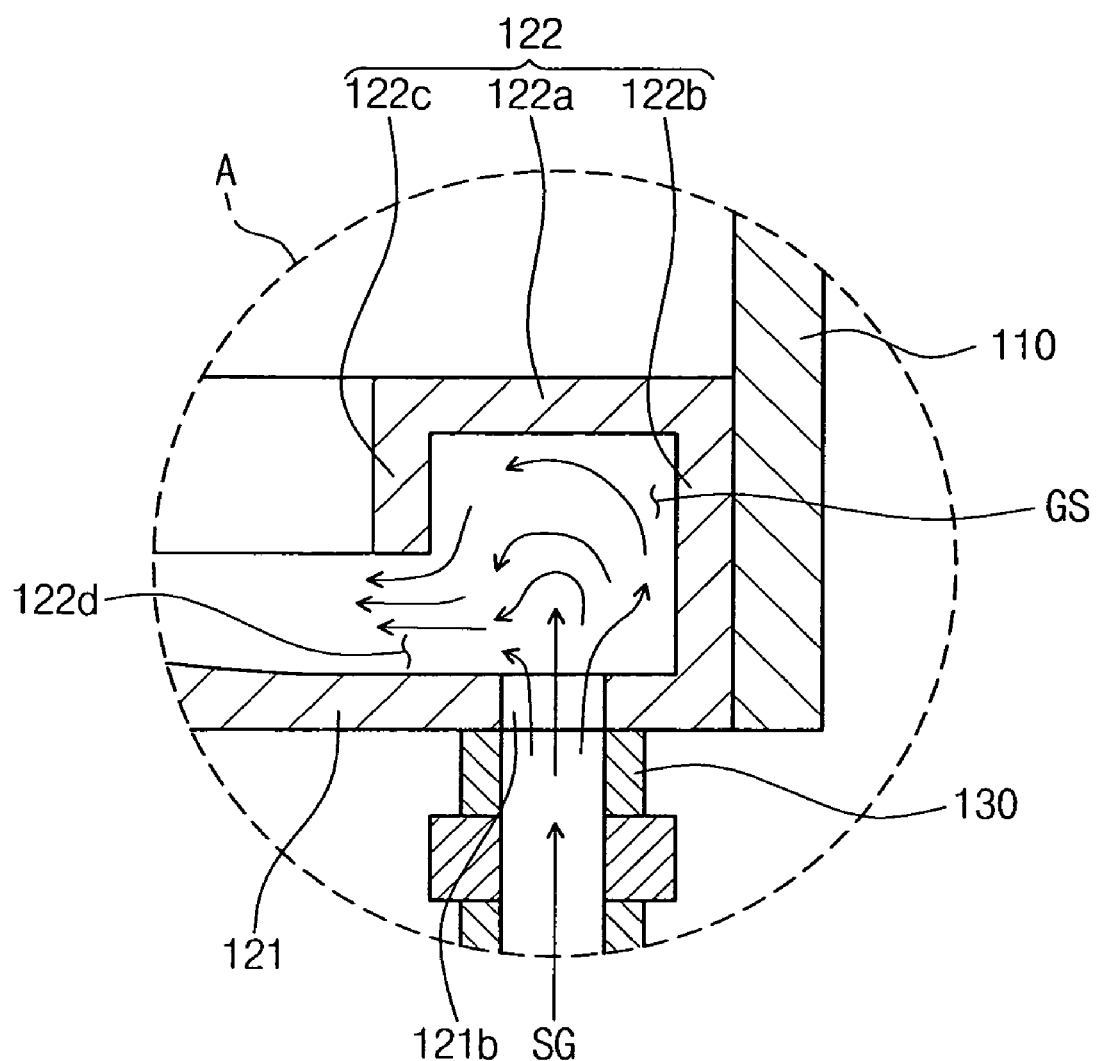
FIG. 4 is an enlarged cross sectional view of region 'A' in FIG. 1.

FIG. 2 is a sectional perspective view of the dispersion plate in FIG. 1, FIG. 3 is a plan view of the dispersion plate in FIG. 2, and FIG. 4 is an enlarged cross sectional view of region 'A' in FIG. 1.

Referring to FIGS. 2 and 3, the dispersion plate 120 includes a plate 121 and a gas guiding portion 122. In one embodiment of the present invention, the plate 121 has circular shape; however, the shape of the plate 121 may differ according to the shape of the reaction chamber 110. The plate 121 is provided on the open bottom surface of the reaction chamber 110 to seal the reaction chamber 110.

A catalyst supply hole 121a, through which the metal catalysts MC are supplied, is defined in the central portion of the plate 121, and metal catalysts MC flow into the reaction space RS (in FIG. 1) through the catalyst supply hole 121a.

A top surface of the plate 121 projects upward toward the center of the plate 121 where the catalyst supply hole 121a is defined, to guide the source gas SG to be discharged from the gas guiding portion 122 to the center of the plate 121. That is, the top surface of the plate 121 is formed as a incline that gradually inclines downward from the catalyst supply hole 121a towards an edges thereof. Here, the thickness of the plate 121 gradually increases from the edges toward the center thereof. In one embodiment of the present invention, the incline of the plate 121 is formed by a concave curved surface to increase the efficiency of guiding the source gas SG.

The source gas SG discharged from the gas guiding portion 122 ascends the incline of the plate 121 to move toward the center of the plate 121, and suspends the metal catalysts MC discharged from the catalyst supply hole 121a in the upper portion of the reaction space RS.

A plurality of gas inlets 121b is formed at the edge of the plate 121. The gas inlets 121b are formed in a region where the gas guiding portion 122 is disposed, and the source gas SG enters the gas guiding portion 122 through the gas inlets 121b. The number of gas inlets 121b may be varied according to the size of each gas inlet and the size of the plate 121.

The gas guiding portion 122 is formed on the upper surface of the plate 121. The gas guiding portion 122 is formed at the edge of the plate 121, and alters the flow passage for source gas SG that enters through the gas inlets 121b towards the center of the plate 121. In one embodiment of the present invention, the gas guiding portion 122 has a ring-shaped plan view, and is integrally formed with the plate 121.

In detail, the gas guiding portion 122 defines a gas storing space GS that stores the source gas SG received through the gas inlets 121b. Also, the gas guiding portion 122 has a gas outlet 122d through which the source gas SG that enters the gas storing space GS is discharged toward the center of the plate 121.

Referring to FIGS. 2 and 4, in one embodiment of the present invention, the gas guiding portion 122 includes a first guide surface 122a, a second guide surface 122b and a third guide surface 122c. The first guide surface 122a faces the upper surface of the plate 121, the second guide surface 122b extends from the plate 121 to define the gas storing space GS and connects with the first guide surface 122a. The third guide surface 122c extends from the first guide surface 122a to face the second guide surface 122b, to define the gas outlet 122d through being separated from the plate 121. In one embodiment of the present invention, the gas outlet 122d is defined by the space between the third guide surface 122c and the plate 121; however, it may alternately be defined by a removed portion of the third guide surface 122c.

The first to third guide surfaces 122a, 122b, and 122c change the flow path of the source gas SG that enters the gas storing space GS, and the source gas SG whose flow path is changed is discharged toward the center of the plate 121 through the gas outlet 122d. The source gas SG discharged through the gas outlet 122d flows along the inclined upper surface of the plate 121 to the center of the plate 121, and suspends the metal catalysts MC flowed through the catalyst supply hole 121a.

Accordingly, the apparatus 100 for producing carbon nanotubes uses the dispersion plate 120 to flow the source gas SG and the metal catalysts MC to the reaction space RS, and guides the source gas SG to move the metal catalysts MC in a certain direction. Therefore, the apparatus 100 for producing carbon nanotubes does not need a separate nozzle for supplying metal catalysts MC, so that movement of the metal catalysts MC is not impeded by the nozzle and loss of the metal catalysts MC can be prevented.

Moreover, the apparatus 100 for producing carbon nanotubes does not require a separate device for uniformly dispersing the source gas SG provided to the dispersion plate (and a space for accommodating such a device), to therefore improve space utilization and reduce manufacturing costs.

Furthermore, the gas guiding portion 122 is provided at the edge of the plate 121, and the source gas SG discharged from the gas guiding portion 122 flows along the upper surface of the plate 121. Therefore, the apparatus 100 for producing carbon nanotubes prevents loading of metal catalysts MC on the plate 121, and prevents channeling.

In other words, referring to FIG. 1, a plurality of gas supply lines 130 is provided below the dispersion plate 120. The gas supply lines 130 are connected one-on-one to the gas inlets 121b, and source gas SG is received from a gas supplying device (not shown) and supplied to the gas guiding portion 122 through the gas inlets 121b.

The heater unit 140 is provided on the outer wall of the reaction chamber 110. The heater unit 140 heats the reaction chamber 110. Accordingly, the reaction space RS is maintained at a suitable temperature for triggering a reaction between the source gas SG and the metal catalysts MC. In one embodiment of the present invention, the reaction space RS is maintained at a high temperature ranging from about 500° C. to about 5,000° C. by the heater unit 140.

The exhaust line 150 is provided at the top of the reaction chamber 110, and the exhaust line 150 is connected to an exhaust hole 111 defined at the top of the reaction chamber 110. Gas filled in the reaction chamber 110 enters the exhaust hole 111 and is discharged to the outside through the exhaust line 150. That is, while the metal catalysts MC and the source gas SG react, the gas filled in the reaction space RS is discharged to the outside through the exhaust line 150. Here, the source gas SG continues to flow into the reaction space RS.

While not shown in the diagrams, the apparatus 100 for producing carbon nanotubes is provided with a carbon nanotube exhaust line for exhausting carbon nanotubes grown on the metal catalysts MC to the outside. The carbon nanotube exhaust line is connected to the sidewall of the reaction chamber 110, and the carbon nanotubes formed within the reaction space RS are exhausted to the outside to a carbon nanotube collecting device (not shown).

Below, the process of producing carbon nanotubes within the reaction space (RS) will be described in detail with reference to the diagrams.

Figure 5:
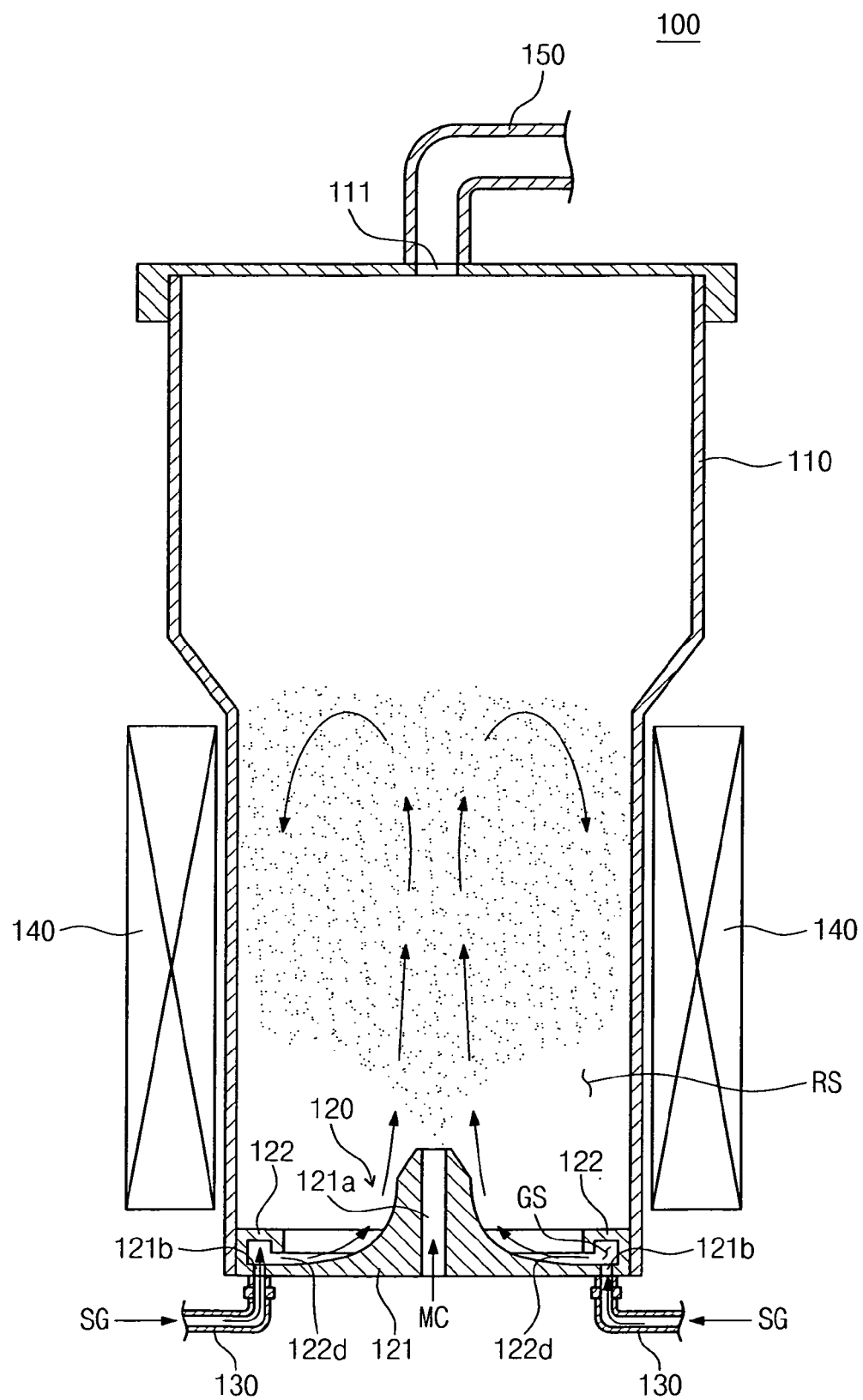
FIG. 5 is a cross sectional view illustrating a process of dispersing metal catalysts in the apparatus for producing carbon nanotubes in FIG. 1.

FIG. 5 is a cross sectional view illustrating a process of dispersing metal catalysts in the apparatus for producing carbon nanotubes in FIG. 1.

Referring to FIGS. 4 and 5, the heating unit 140 heats the reaction chamber 110 to raise the temperature of the reaction space RS to a suitable temperature.

The gas supply lines 130 supply a source gas SG through the gas inlets 121b to the gas storing space GS of the gas guiding portion 122. The source gas SG is supplied at a suitable pressure to the gas supply lines 130 to suspend the metal catalysts MC.

The gas guiding portion 122 alters the flow path of the source gas SG toward the center of the plate 121 to be discharged through the gas outlet 122d. The source gas SG discharged from the gas outlet 122d flows along the inclined upper surface of the plate 121 to rise toward the center of the plate 121 and into the upper portion of the reaction space RS.

Simultaneously, the metal catalysts MC flow through the catalyst supply hole 121a of the plate 121 into the reaction space RS. The metal catalysts MC discharged from the catalyst supply hole 121a flow upward in the reaction space RS by means of the source gas SG guided toward the center of the plate 121 from the gas guiding portion 122.

The metal catalysts MC that move to the top of the reaction space RS are suspended in the circulating source gas SG within the reaction space RS, and react with the source gas SG to produce carbon nanotubes. In the present exemplary embodiment, the source gas SG that flows into the reaction space RS flows and circulates from the edge of the plate 121 to the center of the plate 121 to the upper portion of the reaction space RS to the sidewall of the reaction chamber 110 and back to the edge of the plate 121.

The carbon nanotubes grown on the metal catalysts MC are discharged from the reaction chamber 110 through a separate carbon nanotube exhaust line, and are stored in the carbon nanotube collecting device.

In an apparatus for producing carbon nanotubes according to the present invention, a dispersion plate flow metal catalysts into a reaction chamber, and guides a source gas to move the metal catalysts in a specific direction. Accordingly, the apparatus for producing carbon nanotubes disperses both a source gas and metal catalysts through the dispersion plate, so that there is no need to provide separate a nozzle to supply metal catalysts and a separate device to uniformly disperse a source gas. Therefore, the apparatus for producing carbon nanotubes prevents loss of metal catalysts and prevents channeling, and improves space utilization.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for producing carbon nanotubes, comprising:
   a reaction chamber providing a reaction space for forming carbon nanotubes; and
   a dispersion plate provided on a bottom surface of the reaction chamber, to discharge a source gas in the reaction space for producing the carbon nanotubes, the dispersion plate comprising:
      a plate defining a catalyst supply hole at a central portion thereof for flowing metal catalysts that react with the source gas and produce carbon nanotubes, the metal catalysts flowing through the catalyst supply hole into the reaction space; and
      a gas guiding portion provided on an upper surface edge of the plate, to receive and guide the source gas to a central portion of the plate; and
      wherein the gas guiding portion, together with the plate, defines a gas storing space into which the source gas enters in a first stage, and defines a gas outlet that discharges the source gas that enters the gas storage space toward the central portion of the plate.

2. The apparatus of claim 1, wherein the gas guiding portion comprises:
   a first guide surface facing the plate;
   a second guide surface extending from the plate and connected to the first guide surface; and
   a third guide surface extending from the first guide surface to face the second guide surface, and defining the gas outlet.

3. The apparatus of claim 2, wherein the third guide surface is separated from the plate to define the gas outlet.

4. The apparatus of claim 1, wherein the plate comprises an upper surface that gradually protrudes from the upper surface edge of the plate where the gas guiding portion is provided toward the catalyst supply hole.

5. The apparatus of claim 1, wherein the plate comprises at least one gas inlet through which the source gas flows into the gas storing space.

6. The apparatus of claim 5, further comprising a gas supply line for supplying the source gas through the gas inlet to the gas guiding portion.

7. The apparatus of claim 1, wherein the gas guiding portion has a ring-shaped from a plan view.

8. An apparatus for producing carbon nanotubes, the apparatus comprising:
- a reaction chamber providing a reaction space for forming carbon nanotubes; and
- a dispersion plate provided on a bottom surface of the reaction chamber for flowing a source gas into the reaction space, the dispersion plate comprising:
  - a plate comprising an upper surface inclined downwardly from a center of the plate towards an outer edge of the plate; and
  - a gas guiding portion provided at the outer edge of the plate, the gas guiding portion comprising at least a first guide surface for guiding the source gas towards the center of the plate.

9. The apparatus of claim 8, wherein the plate defines a catalyst supply hole at the center of the plate for flowing metal catalysts that react with the source gas and produce carbon nanotubes, the metal catalysts flowing through the catalyst supply hole into the reaction space.

10. The apparatus of claim 8, wherein the plate comprises at least one gas inlet for flowing source gas in a first direction to the gas guiding portion, the gas guiding portion altering the flow of source gas to at least a second direction towards the center of the plate.

11. The apparatus of claim 8, wherein the plate and gas guiding portion define a gas storing space and gas outlet, the gas storing space disposed between the plate and the at least first guide surface, and the gas outlet for discharging gas from the gas storing space.

12. The apparatus of claim 8, wherein the gas guiding portion comprises:
- the first guide surface facing the plate;
- a second guide surface extending from the plate and connected to the first guide surface; and
- a third guide surface extending from the first guide surface to face the second guide surface and defining a gas outlet.

13. The apparatus of claim 12, wherein the third guide surface is separated from the plate to define the gas outlet.

14. The apparatus of claim 8, wherein the gas guiding portion has a ring-shape from a plan view.

15. The apparatus of claim 9, wherein the catalyst supply hole is centrally disposed along the upper surface of the plate and protrudes upwards and above the outer edge of the plate.

16. The apparatus of claim 8, wherein a thickness of the plate gradually increases from the outer edge to the center of the plate.

17. The apparatus of claim 8, wherein at least one gas supply line is provided below the gas dispersion plate, the at least one gas supply line connected to at least one gas supply inlet for supplying the source gas to the gas guiding portion.

* * * * *